United States Patent
Kraus

[19]

[11] Patent Number: 6,076,781
[45] Date of Patent: Jun. 20, 2000

[54] DEVICE FOR MOUNTING ELONGATE TUBULAR OBJECTS

[75] Inventor: Willibald Kraus, Grunstadt, Germany

[73] Assignee: TRW United-Car GmbH & Co. KG, Germany

[21] Appl. No.: 09/016,067

[22] Filed: Jan. 30, 1998

[30] Foreign Application Priority Data

Feb. 7, 1997 [DE] Germany .......................... 197 04 674

[51] Int. Cl.$^7$ ...................................................... F16L 3/00
[52] U.S. Cl. ...................... 248/73; 248/74.3; 248/231.91
[58] Field of Search .............................. 248/65, 68.1, 73, 248/69, 74.1, 74.2, 74.3, 74.4, 67.7, 62, 63, 224.51, 225.11, 71, 231.91; 411/508, 509, 510, 913

[56] References Cited

U.S. PATENT DOCUMENTS

| | | | |
|---|---|---|---|
| 4,840,334 | 6/1989 | Kikuchi ........................................ | 248/73 |
| 4,870,722 | 10/1989 | Shell, Jr. ............................... | 248/69 X |
| 4,974,798 | 12/1990 | Harding et al. ............................ | 248/73 |
| 5,012,995 | 5/1991 | Ward et al. .............................. | 248/68.1 |
| 5,039,040 | 8/1991 | Idjakiren ................................... | 248/73 |
| 5,106,040 | 4/1992 | Cafmeyer et al. ......................... | 248/73 |
| 5,368,261 | 11/1994 | Caveney et al. ........................... | 248/73 |
| 5,505,411 | 4/1996 | Heaton et al. ............................. | 248/70 |
| 5,730,401 | 3/1998 | Takeda et al. ............................. | 248/69 |
| 5,799,906 | 9/1998 | Hillegonds ............................. | 248/69 X |
| 5,921,510 | 7/1999 | Benoit et al. .............................. | 248/71 |

FOREIGN PATENT DOCUMENTS 2 717 554-A1  9/1995  France .
0 791 997 A1  8/1997  Germany .

OTHER PUBLICATIONS

XP–002064293—Trends in Cable Fastening Technique (article).

*Primary Examiner*—Ramon O. Ramirez
*Assistant Examiner*—Tan Le
*Attorney, Agent, or Firm*—Fay, Sharpe, Fagan, Minnich & McKee, LLP

[57] ABSTRACT

The invention relates to a device for mounting of pipes, cables, or other elongate tubular objects to an operatively associated support member. The mounting device includes a holding region 1, a bearing region 2, and a winding zone 10. The holding region 1 is provided for selectively attaching the mounting device to the operatively associated support member. The bearing region is disposed on the holding area and extends in opposite directions from opposite sides thereof. The bearing region includes a face side S adapted to engage elongate tubular objects such as pipes, cables, or the like. The bearing region is further adapted to selectively attach or otherwise engage the mounting apparatus to the elongate tubular objects using at least one band-shaped fastening element wrapped around the bearing region and the tubing members. Lastly, a winding zone 10 is formed by the bearing region and includes at least two resilient arm members 7, 8, 9 extending in parallel to the elongate tubular member and along at least one of the opposite directions into which the bearing region extends.

40 Claims, 3 Drawing Sheets

DEVICE FOR MOUNTING ELONGATE TUBULAR OBJECTS

BACKGROUND OF THE INVENTION

The subject invention is directed to the art of connectors and, more particularly, to devices for mounting pipes, cables, or other elongate tubular objects to an associated support member.

One known pipe mounting device having a bearing region shaped in the form of a dish is taught in FR-PS 2 717 554. According to that teaching, a pipe to be fastened to a support member is attached to a pair of clip-like elements disposed in the center of the dish. In addition to the capability of clipping the pipe to the clip-like elements, the device taught in the above document also provides the possibility of banding several pipes together by means of self-adhesive band-shaped fastening elements which are, in turn, attached to the dish-like bearing region of the connector device. One disadvantage of the above construction, however, is that the band-shaped fastening elements can easily become detached. When that happens, the one or several pipes are no longer secured to the device and become detached therefrom.

In addition to the above-described connector, other devices for mounting pipes to support members are known such as, for example, the device taught in CA-PS 695 251. According to that teaching, a relatively short bearing region is provided in the pipe mounting device. The bearing region has, on the underside thereof, a transverse opening through which one or more band-like fastening elements can be extended to encircle the one or more pipes and, as the bands are tightened, lash the pipes to the bearing region. However, using this arrangement, the pipes to be fastened to the mounting device are attached only over a relatively small bearing region area.

Another pipe mounting device is taught in GB 215 900 A. According to that teaching, a pair of hinged semi-dish like elements are provided on a main body of the connector device. The hinged dish-like elements are adapted to pivot on the hinges and grip around the pipes fastened to the mounting device. This mounting device, however, is somewhat limited in application.

SUMMARY OF THE INVENTION

The subject invention overcomes the above-noted drawbacks and disadvantages of the prior art pipe mounting devices. Devices of the invention provide excellent fastening of pipes, cables, or other elongate tubular objects to support members. Moreover, devices formed in accordance with the invention provide assurance that, even over an extended period of time, the pipes, cables, or other elongate tubular members remain securely affixed to the mounting device.

In accordance with the subject invention, there is provided a mounting apparatus for connecting an elongate tubular object to a support member, the mounting apparatus including a holding region, a bearing region, and a winding zone. The holding region is adapted to selectively attach the mounting apparatus to an operatively associated support member. The bearing region is provided on the holding region and extends in opposite directions from opposite sides of the holding region. The bearing region includes a face side adapted to engage the elongate tubular object and selectively attach to the elongate tubular object using at least one band-shaped fastening element wrapped around the bearing region and the tubing member. Lastly, the winding zone is formed by the bearing region and includes at least two resilient arm members extending in parallel to the elongate tubular member and along at least one of the opposite directions in which the bearing region extends.

In order to ensure that the pipes or other tubular objects remain fastened to the pipe mounting apparatus, the bearing region includes a pair of winding zones consisting of at least two resilient arms extending in parallel with the major longitudinal axis of the pipe connected to the mounting apparatus. The winding zone creates a resilient region which prevents the band-shaped fastening elements encircling the winding zone from becoming detached. The pipes, cables, or elongate tubular objects are thereby correctly attached to the mounting apparatus and, further, are thereby operationally secured to the mounting device of the invention.

According to the invention, each winding zone preferably consists of three resilient flexible arms, each being separated from each other by a pair of slots. In this arrangement, the two outer resilient arms are advantageously designed having outside edges which are conically outwardly tapered relative to the holding region so that a highly desirable spreading effect is achieved in a relatively simple fashion. When used in connection with narrow pipes, tubes or cables, the pair of outer resilient arms are positionable above one another whereby, a very secure fastening of the narrow tubes or cables are obtained by the invention.

The one or more resilient arms in the winding zone are selectively fitted on the undersides thereof with at least one stop nose member or, preferably, several stop nose members evenly spaced apart from one another on the underside of the winding zone. The stop nose members have a saw tooth shape or configuration. As a result, the band-like fastening elements looped around the winding zone are more securely attached thereto, specifically, with regard to displacement of the band-like fastening elements along the major longitudinal axis defined generally by the pipe or tube. In addition to the above, a hook-like stop nose member is alternatively provided at the ends of the winding zone in order to realize an advantageous effect similar to the results derived from the one or several stop nose members.

In accordance with a second preferred embodiment of the invention, each winding zone is configured to verge into an enlarged, mid-region of the mounting device which is, in turn, connected with the holding region thereof. The mid-region is connectable in a conically tapering fashion with the pair of winding zones whereby the conically tapering part of the mid-region is preferably fitted with a set of lateral recesses. As a result, a type of bridge is thereby formed providing significant savings in material but without sacrificing much rigidity or firmness in the pipe mounting apparatus of the invention.

In addition to the above, the mid-region of the pipe mounting device includes, above the holding region, a transverse recess which extends cross-wise to the longitudinal direction of the axis defined by the pipe received in the mounting apparatus. The transverse recess is adapted to receive a cable band or the like therethrough. In addition, the transverse recess includes at least one locking element member disposed therein for engaging the banding member within the transverse recess.

In accordance with the invention, the transverse recess is useful for accommodating cable bands in addition to those provided on the winding zone. The additional cable bands are fastened to the device of the invention cross-wise to the longitudinal direction defined by the major longitudinal axis of the pipe in the mounting device. Thereby, additional tubular elements can be attached to the device of the invention via the additional cable band and support therefore provided by the transverse recess.

In a second preferred embodiment of the invention, there is provided one or more stop cog members disposed above the winding zone and/or the mid-region of the pipe mounting apparatus. The one or more stop cog members are arranged centrally or laterally and/or at the same or different distances from one another on the top surface of the winding zones and/or the mid-region of the mounting apparatus as needed. Operationally, the stop cog members are pressed into engagement with the circumference of the one or several pipes mounted to the connecting apparatus of the invention. Thereby, the stop cop members cooperate with the band-like fastening elements looped around the winding zones to achieve an excellent secure mounting of the pipes or cables to the apparatus of the subject invention.

A circumferential sealing lip is alternately arranged between the holding region and the mid-region of the pipe mounting apparatus of the subject invention. The circumferential sealing lip is selectively fitted at a front end thereof with a sealing ring consisting of a material softer than the material forming the sealing lip proper. This combination results in an excellent sealing effect which is useful in connection with certain support openings. The sealing ring member is designed to have a particular cross-sectional profile such as, preferably, polygonal or round.

The holding region of the pipe mounting apparatus is preferably fashioned in the form of a clip, but, alternately takes the form of a profile bolt, a threaded bolt, a part of a bayonet locking unit, or a slider bearing. When the holding region is fashioned in the preferred form of a clip, the cross section thereof is selectively a one of a round, oval, or rectangular configuration, based upon the shape of the existing support opening necessary to accommodate the threaded bolt, stud, or other object forming the support member onto or upon which the pipe mounting apparatus of the invention is to be attached. In one embodiment, the clip has, distributed over its circumference, at least two resilient stop arms oriented toward the sealing lip which are, preferably, fitted in front with one or several graduations. The resilient stop arms are adapted to grab behind the respective support opening with the graduations and, thus, fasten the subject mounting apparatus of the invention to an aperture or opening formed in a target support member.

Alternatively, the bearing region of the subject mounting apparatus of the present invention includes a convex winding zone extending in a longitudinal direction along the major axis defined by the pipes or elongate tubular members carried thereon. The pipes or tubular members to be fastened to the subject mounting apparatus are embedded in the convex winding zone when they are attached to the mounting apparatus to thereby realize a secure pipe mounting.

In a further preferred embodiment of the pipe mounting apparatus of the invention, at least one stop nose member is provided having a saw tooth or cog design or configuration. The at least one stop nose member is disposed below the curvature of the winding zone and in at least an anterior portion of the bearing region.

In accordance with another characteristic of the pipe mounting apparatus of the present invention, at least one transverse recess is provided in the central area or mid-part of the bearing region below the curvature of the pipe mounting apparatus holding the pipes. The transverse recess extends cross-wise relative to the longitudinal direction defined generally by the pipes, cables, or elongate members attached to the mounting apparatus. In addition, a pair of transverse recesses are alternatively provided at the central area or mid-part of the bearing region, the pair of recesses being separated by a predetermined distance from each other.

In yet another embodiment of the pipe mounting apparatus of the invention, the winding zone defines an enlarged curvature in the central area or mid-part of the bearing region. The enlarged curvature is either symmetrically or asymmetrically fashioned with respect to the bearing region as needed.

In order to more securely stabilize the bearing region, the winding zone of the subject pipe mounting apparatus is alternatively provided with, at each terminal end thereof, an angle-shaped nose member. The angle-shaped nose members extend in a direction opposite the face side of the winding zone and towards the associated support member.

In yet another embodiment of the invention, the holding region is arranged alongside the mid-part of the bearing region and is laterally displaced therefrom. The laterally displaced holding region is alternatively fashioned in the form of a clip, a threaded bolt, or as part of a bayonet locking unit.

For arrested acceptance of a profiled bolt in the laterally displaced holding region described above, the region is provided with a recess which includes at least two resilient arresting elements. In addition, the recesses in the holding region alternatively include a covering on top thereof or a limitation or blocking member, for example, in the form of a cross-piece member useful as an installation aid. In that regard, the installation aid provided by the blocking or cross-piece member ensures that the respective parts will always be attached to the operatively associated external support member in a functionally correct manner.

As is evident from the foregoing, a primary object of the invention is to provide an extremely simple pipe mounting apparatus capable of mounting one or more pipes, cables, or elongate tubular members to an operatively associated support member.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein:

FIG. 12 is a top elevational view of the pipe mounting apparatus shown in FIGS. 10 and 11;

FIG. 13 is a perspective view of the pipe mounting apparatus shown in FIGS. 10–12; and, FIGS. 14 and 15 are perspective views of pipe mounting apparatus formed in accordance with a fourth embodiment of the present invention.

DETAILED DESCRIPTION OF THE PREFERRED EMBODIMENTS

Referring now to the drawings wherein the showings are for the purposes of illustrating the preferred embodiments of the invention only and not for purposes of limiting same, FIGS. 1–4 show the subject pipe mounting device formed in accordance with a first preferred embodiment of the invention. The pipe mounting apparatus substantially consists of a holding region 1 and a bearing region 2 projecting from both sides beyond the holding region 1. The holding region 1 is adapted to be connected to an operatively associated external support member (not shown).

Figure 2:
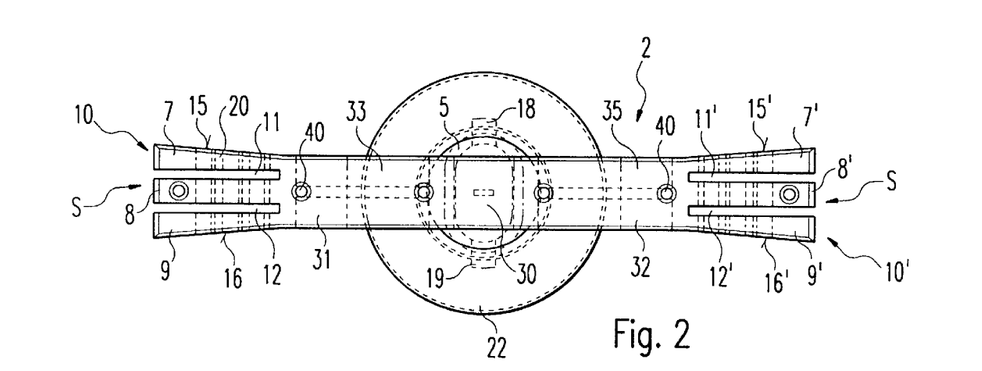
FIG. 2 is a top elevational view of the device shown in FIG. 1.

As shown best in FIG. 2, the bearing region includes, on its face side S, a pair of winding zones 10, 10'. The winding zones 10, 10' are each preferably formed as illustrated including three resilient arm members 7, 8, 9 and 7', 8', 9' on each end. Each of the exemplary resilient arm members are separated from each other by a pair of slots 11, 12 and 11', 12' respectively.

As is further apparent from FIG. 2, the two exterior resilient arm members 7, 9 and 7', 9' are designed to form a conically tapering outside surface which widens the winding zone relative to the holding region. More particularly, each of the exterior arms 7, 9 and 7', 9' among the three resilient arm members define conical surfaces 15, 16 and 15', 16', respectively. As a direct result of the conical surfaces defined by the exterior arm members 7, 9 and 7', 9', each of the winding zones 10, 10' enable a spring effect applied to the band-shaped fastening elements 41, 41' represented in FIG. 1 by dotted lines.

Figure 1:
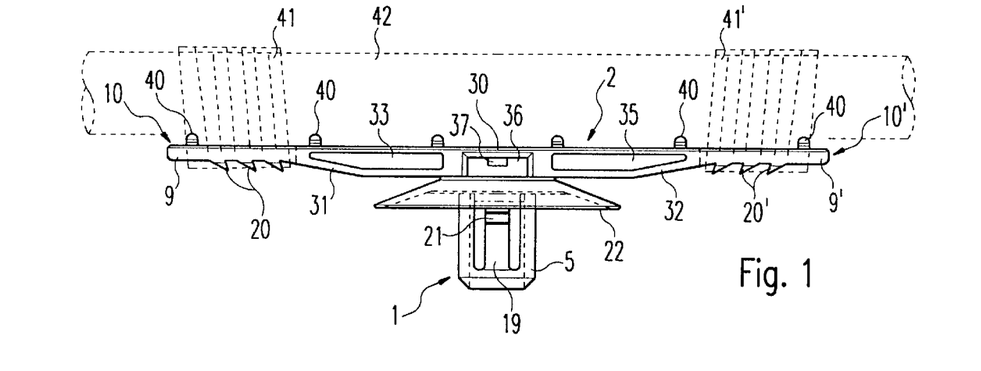
FIG. 1 is an elevational front view of a pipe mounting apparatus formed in accordance with a first preferred embodiment of the invention.

In use, the band-shaped fastening elements 41, 41' are preferably looped around a pipe member 42 attached to the pipe mounting device of the subject invention. In that regard and as illustrated, the band-shaped fastening elements are preferably wrapped around the pipe 42 in the winding zones 10, 10' and thereby experience the spring force of the two exterior arm members 7, 9 and 7', 9' as the fastening elements are tightened. The spring effect deriving from the conical surfaces 15, 16 and 15', 16' defined in the pair of exterior arms 7, 9 and 7', 9' help prevent unintentional separation of the pipe 42 from the pipe mounting device of the subject invention. The spring effect tends toward expanding the fastening elements thus urging them into a taut state without slack. In addition, the preferred construction of the invention as described above helps maintain pipes, cables, or elongate tubular members 42 attached to the subject pipe mounting apparatus over extended periods of time and under the influence of heat or the like.

In order to further secure the band-shaped fastening elements 41, 41' to the winding zones 10, 10', the resilient arms 7, 8, 9 and 7', 8', 9' are preferably provided on the underside thereof with stop noses or stop members 20, 20'. The stop noses are formed on the bottom side of the bearing region 2 opposite the face side S. As illustrated, the stop noses are, preferably, formed in a saw tooth shape or configuration. In use, the stop noses clasp into the respective band-shaped fastening elements 41 or 41' and secure the location of the fastening elements into position on the winding zone 10, 10' after the fastening elements are looped around one or several pipes 42 which are fastened to the pipe mounting apparatus of the subject invention.

Although the stop noses 20, 20' are preferably formed in a saw tooth shape or configuration, other shapes are also possible. As an example, the stop noses can be configured into a different cross-sectional configuration or the set reduced in number to provide only a single stop nose which has the shape of a hook or the like which limits the respective face side S of the resilient arm members 7, 8, 9 and 7', 8', 9'. In order to further secure and ensure the connection of the pipes 42 fastened to the subject pipe mounting apparatus of the present invention, there are preferably provided, on the top face side S surface of the bearing region 2, a set of stop cogs 40 which are disposed on the bearing region at equal distances from each other as best shown in FIGS. 1 and 2. The set of stop cogs, as shown in FIG. 2, are preferably centrally arranged on the surface of the bearing region 2 and extend to the anterior region of the middle arm members 8 and 8'. The set of stop cogs 40 can have any random shape or configuration as needed. However, the shape and position of the stop cogs are preferably selected so that during the looping together of the fastened pips 42 with the band-shaped fastening elements 41, 41', the stop cogs 40 act upon the exterior surface or circumference of the pipes fastened to the mounting device so that additional security against movement of the pipes relative to the pipe mounting device is provided.

As a result of providing winding zones 10, 10' with three resilient arm members 7, 8, 9 and 7', 8', 9', it is also a beneficial result of the subject invention to securely connect the pipe mounting device to pipes, cables, or elongate tubular members having, for example, a much small diameter than that illustrated in FIG. 1. In that case, the exterior resilient arm members 7, 9 and 7', 9' are movable under the influence of the tightening of the strap members 41, 41' so that the exterior arm members are placed, at least partially, on top of the respective middle arms 8, 8'. In that way, the outer exterior arm members 7, 9 and 7', 9' establish and maintain a "spreader effect" against the clamping force of the band-shaped fastening elements 41, 41' so that together the exterior arm members and band-shaped fastening elements securely halter cable, pipes, or elongate tubular members of lesser diameter to the subject pipe mounting apparatus of the present invention.

Figure 3:
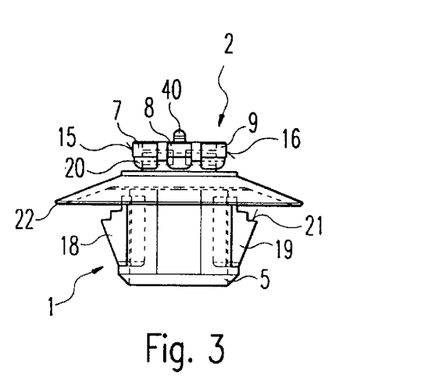
FIG. 3 is a side elevational view of the devices shown in FIGS. 1 and 2.
Figure 4:
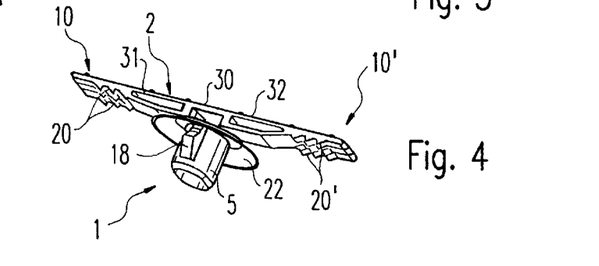
FIG. 4 is a perspective view showing the pipe mounting apparatus of FIGS. 1–3.

With continued reference to FIGS. 1–4, but with particular reference once again to FIG. 1, the winding zones 10, 10' preferably respectively verge into an elongated mid-region 30 which is connected to the holding region 1. The mid-region 30 is preferably connected with the two winding zones 10, 10' via conically tapering parts or members 31, 32. The conically tapering parts or members are selectively provided with lateral recesses 33, 35 as best shown in FIGS. 1 and 4. The lateral recesses 33, 35 provide a bridge for the pipe mounting apparatus which results in a high positional stability of the pipe mounting apparatus to the operatively associated support member to which it is to be connected while, at the same time, saving in material costs associated with the manufacture of the subject pipe mounting device.

Figure 4A:
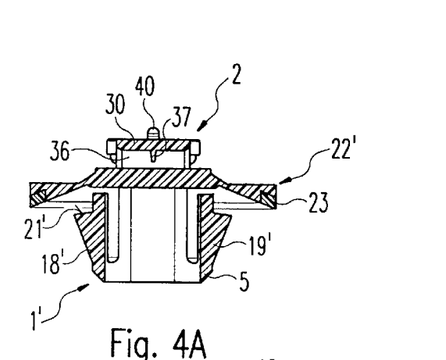
FIG. 4A is a cross-sectional view of an alternative embodiment to the device shown in FIG. 3.

As best shown in FIG. 1 and in the cross-sectional view illustrated in FIG. 4A, the mid-region 30 is disposed above the holding region 1 and has a transverse recess 36 extending through the holding region cross-wise to the longitudinal direction defined generally by the pipe or elongate tubular member 42 connected to the subject pipe mounting apparatus. The transverse recess 36 is preferably fitted or provided with a locking element 37. The transverse recess 36 together with the locking element 37 formed therein provide for an additional recess or aperture through which to thread one or more band-shaped fastening elements for looping around additional pipes, tubular members, or the like. The transverse recess 36 together with the locking element 37 cooperate to securely attach in a displacement-proof manner, tubes, cables, or the like to the device of the invention.

Turning now more particularly to FIGS. 1, 3, and 4, the holding region 1 is alternatively preferably fashioned or constructed in the form of a clip, a profiled bolt, a threaded bolt, as part of a bayonet locking unit, or as a slider-bearing. In the exemplary preferred embodiment illustrated in those FIGURES, the holding region 1 is in the form of a clip 5. The clip may take on many other forms such as, for example, a clip having a round, oval, or rectangular cross section. In any case, according to FIGS. 1 and 3, at least two stop arm members 18, 19 are provided distributed over the circumference of the clip 5. Preferably, one of the pair of stop arms are elastic, and the other rigid. Alternatively, each of the pair of stop arms may be resiliently biased to retain their orientation as illustrated in the FIGURES.

The clip 5 is preferably fitted above the stop arms 18, 19 with a circumferential sealing lip member 22. With respect to the exemplary preferred embodiment illustrated in FIGS. 1–4, the circumferential sealing lip member 22 is constructed of a single unitary piece. Other exemplary alternative embodiments such as illustrated in FIG. 4A include providing the circumferential sealing lip member 22' with a front sealing ring member 23 consisting of a softer material than that forming the sealing lip member 22'. In cross section, the sealing ring member 23 is preferably designed to form a polygonal or round shape. The preferred shape of the sealing ring member results in additional sealing effect vis-a-vis an aperture formed in the operatively associated support member (not shown) into which the subject pipe mounting apparatus of the present invention is to be attached.

As best illustrated in FIG. 3, the stop arms 18, 19 and 18', 19' are oriented toward the sealing lip member 22, 22' and, preferably, are provided with a plurality of graduations 21 or, alternatively as illustrated in FIG. 4A, with a single graduation 21'. The graduations 21, 21' are adapted to engage the underside or backing surface of a support opening into which the subject pipe mounting apparatus is to be connected. The graduations 21, 21' cooperate with the sealing lip member 22, 22' to establish a secure and sealed attachment to the operatively associated support member (not shown). The sealing ring member 23 is preferably joined to the sealing lip member 22' by mechanical attachment means or by means of any of the several well known two-component extrusion processes.

Although not illustrated in the FIGURES, the sealing lip member 22 may alternatively be provided with a series of perforations to enable the sealing ring member 23 to be mechanically mounted to the sealing lip member 22'. In that alternative preferred embodiment, cones are provided on the sealing ring 23 for engaging the perforations in the sealing lip and holding the sealing ring member to the lip member. Preferably, the cones are fitted with heads which are adapted to engage behind the perforations and thus fasten the sealing ring to the underside of the sealing lip. Alternatively, instead of cones, cross-piece-shaped holding elements may also be provided, the holding elements being adapted to embed themselves into the recesses or perforations thereby passing through and attaching the sealing ring to the sealing lip member 22'.

It is an advantage of the present invention that a very secure fastening of one or several pipes or cables or other tubular objects to the operatively associated support member is provided by the interaction of the pair of conically tapering slotted winding zones 10, 10' and, in addition, the other elements or components of the subject device as described above as well. The one or several pipes, cables, or other tubular objects are immovably fastened to the device according to the subject invention together with one or more band-shaped fastening elements 41, 41' which also contribute to the secure connection of the pipes to the pipe mounting apparatus. The "spreader effect" of the widened winding zones in cooperation with the stop nose members 20, 20' and the stop cogs 40 further enhance the secure immovable connection of the pipes to the mounting device. The spreader effect keeps the band-shaped fastening elements taut.

Figures 5, 6, 7:
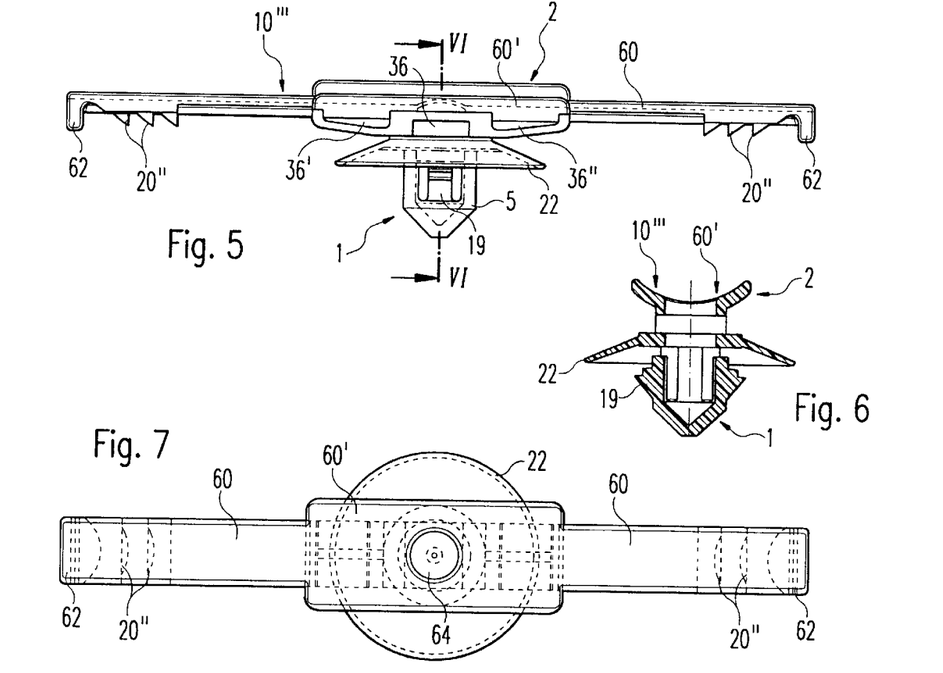
FIG. 5 is a front elevational view of a pipe mounting apparatus formed in accordance with a second preferred embodiment of the invention.
FIG. 6 is a cross-sectional view taken along line VI—VI of FIG. 5.
FIG. 7 is a top elevational view of the pipe mounting apparatus shown in FIG. 5.

Turning now to FIGS. 5–9, a second preferred embodiment of the subject invention is illustrated for fastening pipes, cables, or other elongate tubular objects to an operatively associated support member (not shown). As shown, a bearing region 2 extends in opposite directions from opposite sides of a holding region 1. At least one pipe is fastenable to the bearing region 2 projecting from the holding region 1. The bearing region 2 includes a pair of winding zones 10''' formed in the shape of an arch 60 extending in a longitudinal direction in parallel to the longitudinal direction defined generally by the elongate pipes disposed in the subject pipe mounting device. The arch 60 is best illustrated in FIG. 6.

In a manner substantially as described with reference to the aforementioned preferred embodiment, the embodiment illustrated in FIGS. 5–9 include at least one stop nose member 20" disposed below the arch 60 of the winding zone 10'''. The at least one stop nose 20" is arranged in the anterior part of the bearing region 2 as illustrated. The stop nose member 20" is preferably formed in the shape of a saw tooth configuration as best illustrated in FIG. 5 or, alternatively, as a cog 20''' best illustrated in FIG. 15. As shown there, one or more stop nose members 20" are provided for additional advantageous beneficial results.

Figures 8, 9:
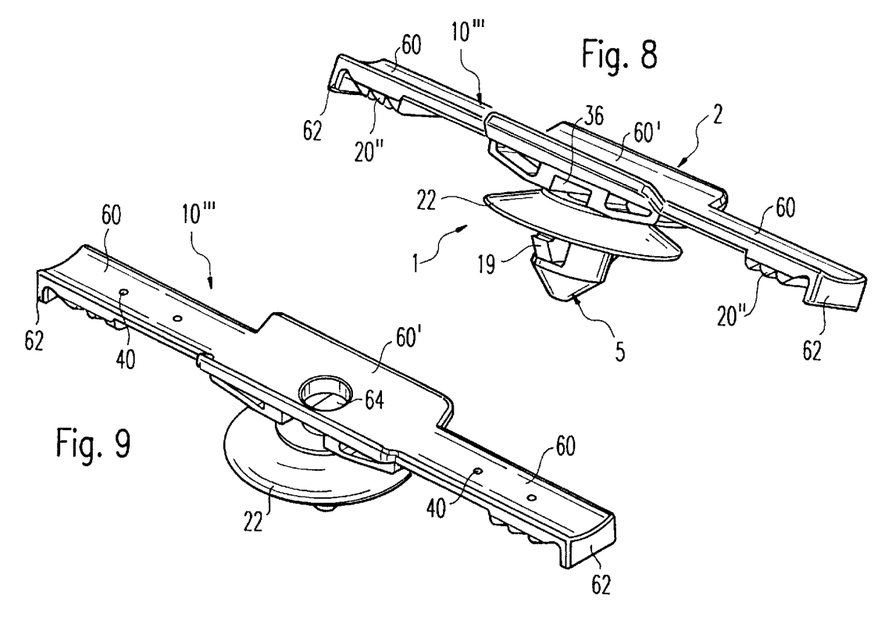
FIGS. 8 and 9 are perspective views of the pipe mounting apparatus shown in FIGS. 5 and 7, respectively.
Figure 10:
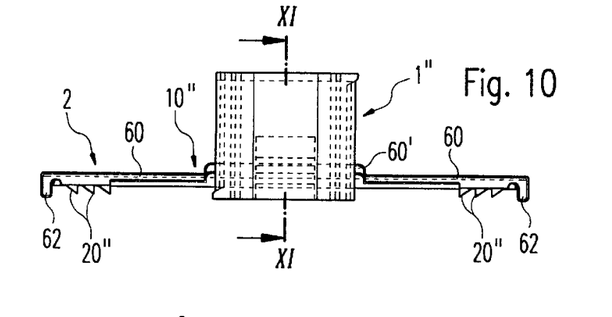
FIG. 10 is a front elevational view of a pipe mounting apparatus formed in accordance with a third preferred embodiment of the invention.

Turning now more particularly to FIGS. 7 and 9, the winding zone 10''' formed in the mid-part or central region of the bearing region 2 is preferably provided with an enlarged arch 60'. The enlarged arch 60' is preferably symmetrically disposed about a central opening 64 as best shown in FIG. 9. In addition, as shown in FIG. 5, a transverse recess 36 is provided through mid-part or central region of the bearing region 2 below the arch 60 or 60'. The transverse recess 36 extends in a cross-wise direction with respect to the longitudinal axis of a pipe or cable disposed on the subject pipe mounting device of the present invention. Alternatively, a plurality of transverse recesses 36', 36" may be provided through the mid-part or central region of the bearing region 2. Preferably, the pair of transverse recesses 36, 36" extend in a direction crosswise to the longitudinal pipe direction described above.

An angular nose member is shown provided on the winding zone 60 in FIGS. 5 and 8. The angular nose members 62 provide additional stabilization to the bearing region 2 so that the subject pipe mounting device of the invention is adopted to stably rest on an operatively associated support member to which it is attached.

Turning next to FIGS. 7 and 9 in particular, the holding region 1 is preferably provided with an elongate opening 64 extending through the enlarged arch member 60'. In addition, as shown in FIG. 9, at least one stop cog 40 is provided on the top side of the curved winding zone 10'". In the specific alternative preferred embodiment illustrated in FIGS. 5–9, the holding region is provided with an elastic sealing lip member 22 and is fashioned in the shape of a clip 5. As indicated above, the clip can take on many alternative preferred configurations such as a round, oval, or rectangular cross section. In addition, the clip may be provided with one or more stop arms 19 which are formed and function in a manner substantially corresponding to the form and function of the stop arms described above.

All of the aforementioned specific preferred embodiments include a holding region 1, 1' that is centrally located beneath the bearing region 2. However, a third preferred embodiment of the subject pipe mounting device of the present invention includes a holding region 1" that is arranged alongside the middle part or central region of the bearing region 2. In that regard, the holding region 1" is laterally displaced from the middle part or central region of the bearing region 2 in a manner as illustrated in FIGS. 10–13.

Figure 11:
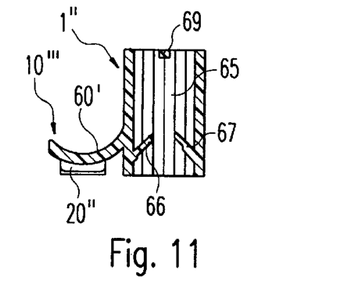
FIG. 11 is a cross-sectional view taken along line XI—XI of FIG. 10.
Figures 12, 13, 14:
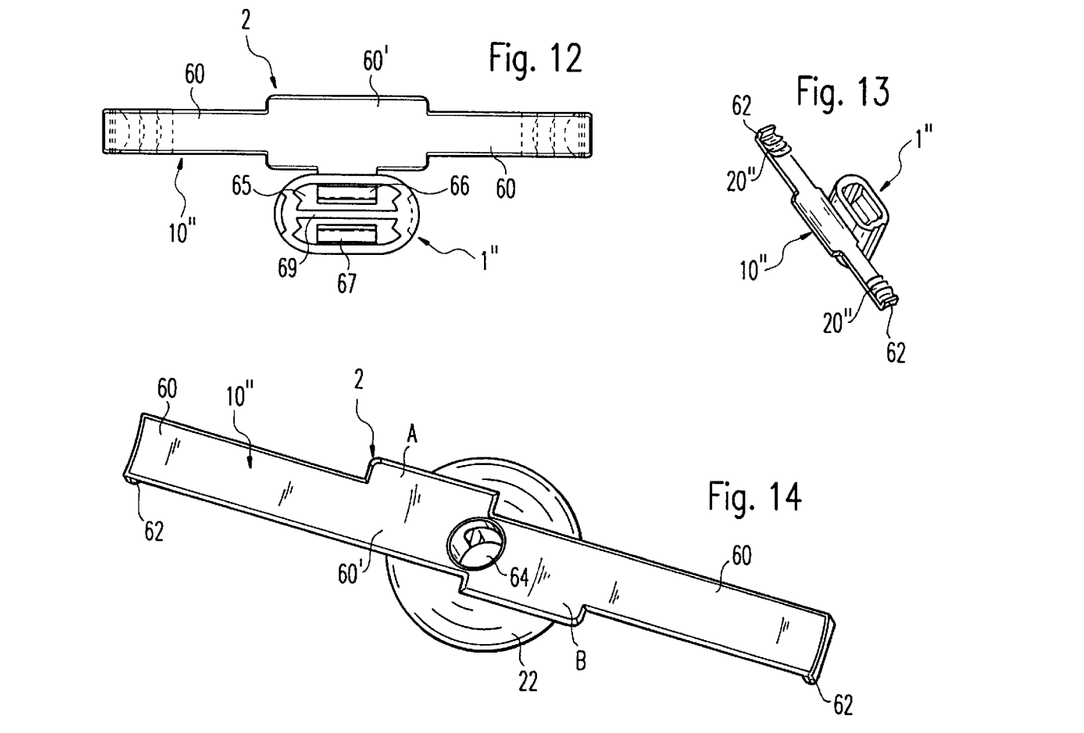

Turning now to those FIGURES and with particular reference to FIGS. 11 and 12, the holding region 1" is preferably formed in a shape adapted to accept a profiled bolt therethrough such as, for example, a coarse threaded bolt or a pine tree bolt. For that purpose, the holding region 1" is preferably provided with a recess 65 which includes at least two resilient arresting arm members 66, 67 which are best illustrated in FIG. 11. A cover member or other limitation of blocking member is preferably provided on the top of the recess 65 which, as illustrated, is formed in the shape of a cross-piece 69 which prevents the device of the subject invention from being incorrectly installed on a corresponding threaded bolt, pine tree bolt, or other similar stud member. Because of the orientation and positioning of the cross-piece 69, there is provided a mechanical guarantee that the operatively associated support member or bolt or the like will not be introduced into the recess 65 from below.

Those skilled in the art will appreciate that the holding region 1" may be formed into the shape of a profiled bolt or threaded bolt or as part of a bayonet locking unit or the like as an equivalent alternative preferred embodiments to that illustrated in FIGS. 10–13.

Figure 15:
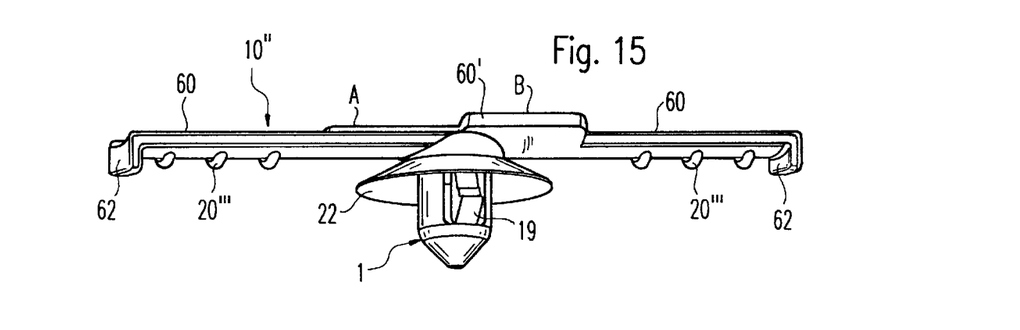

Turning next to FIGS. 14 and 15, yet a fourth preferred embodiment of the invention is illustrated. As shown there, the mid-part or central region of the bearing region 2 is provided with an enlarged arch 60'. The enlarged arch is preferably asymmetrically disposed about the central opening 64 in a manner as illustrated. As best shown in FIG. 14, enlarged regions A, B of the enlarged arch 60' are diagonally opposite from each other and face each other diagonally in a manner as illustrated.

In the alternative preferred embodiment illustrated, the holding region 1 preferably includes an opening 64 extending through the enlarged arch 60' as shown.

By means of the aforementioned specific preferred embodiments of the invention, there is obtained, through a simple design, superb fastening of one or several pipes, cables, or other elongate tubular objects to a pipe mounting device and, in turn, to an operatively associated support member. It is an advantage of the present invention that the one or more pipes, cables, or other tubular members are securely held in a displacement-proof and fixed orientation on the pipe mounting device and relative to the associated support member.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A mounting apparatus for connecting an elongate tubular object to a support member, the mounting apparatus comprising:

a holding region for selectively attaching the mounting apparatus to an operatively associated support member;

a bearing region on the holding region and extending in opposite directions from opposite sides of the holding region, the bearing region having a face side adapted to engage an associated elongate tubular object and selectively attach to the elongate tubular object using at least one fastening element wrapped around the bearing region and the tubing member; and, a winding zone formed by the bearing region, the winding zone including at least two resilient arm members separated from each other by at least one slot, the at least two resilient arm members extending in parallel to said elongate tubular member and along at least one of said opposite directions.

2. The mounting apparatus according to claim 1 wherein free ends of said pair of outer resilient arm members are outwardly tapered relative to the holding area so that said mounting apparatus is wider at said free ends than at said bearing region.

3. The mounting apparatus according to claim 1 wherein the at least two resilient arm members include at least one stop member disposed on a side of the at least two resilient arm members opposite said face side.

4. The mounting apparatus according to claim 3 wherein said at least two resilient arm members include a plurality of spaced apart stop members disposed on said side of the at least two resilient arm members opposite said face side.

5. The mounting apparatus according to claim 1 wherein said holding region is formed as a one of a clip, a profiled bolt, a threaded bolt, a bayonet locking unit, and a slider bearing.

6. A mounting apparatus for connecting an elongate tubular object to a support member, the mounting apparatus comprising:

a holding region for selectively attaching the mounting apparatus to an operatively associated support member;

a bearing region on the holding region and extending in opposite directions from opposite sides of the holding region, the bearing region having a face side adapted to engage an associated elongate tubular object and selectively attach to the elongate tubular object using at least one fastening element wrapped around the bearing region and the tubing member; and.

a winding zone formed by the bearing region, said winding zone including three resilient arm members extending in parallel to said elongate tubular member and along at least one of said opposite directions and separated from each other by a pair of slots, the three resilient arm members including a center resilient arm member and a pair of outer resilient arm members separated from the center resilient arm member by said pair of slots.

7. The mounting apparatus according to claim 6 wherein free ends of said pair of outer resilient arm members are outwardly tapered relative to the holding area so that said mounting apparatus is wider at said free ends than at said bearing region.

8. A mounting apparatus for connecting an elongate tubular object to a support member, the mounting apparatus comprising:

a holding region for selectively attaching the mounting apparatus to an operatively associated support member;

a bearing region on the holding region and extending in opposite directions from opposite sides of the holding region, the bearing region having a face side adapted to engage an associated elongate tubular object and selectively attach to the elongate tubular object using at least one fastening element selectively wrapped around the bearing region and the tubing member; and, a winding zone formed by the bearing region, the winding zone including at least two resilient arm members extending in parallel to said elongate tubular member and along at least one of said opposite directions, the at least two resilient arm members include at least one stop member disposed on a side of the at least two resilient arm members opposite said face side.

9. The mounting apparatus according to claim 8 wherein said at least two resilient arm members include a plurality of spaced apart stop members disposed on said side of the at least two resilient arm members opposite said face side.

10. The mounting apparatus according to claim 9 wherein said plurality of spaced apart stop members are shaped in a saw tooth configuration.

11. The mounting apparatus according to claim 8 wherein said at least two resilient arm members are separated from each other by at least one slot.

12. The mounting apparatus according to claim 8 wherein said holding region is formed as a one of a clip, a profiled bolt, a threaded bolt, a bayonet locking unit, and a slider bearing.

13. A mounting apparatus for connecting an elongate tubular object to a support member, the mounting apparatus comprising:

a holding region for selectively attaching the mounting apparatus to an operatively associated support member;

a bearing region on the holding region and extending in opposite directions from opposite sides of the holding region, the bearing region having a face side adapted to engage an associated elongate tubular object and selectively attach to the elongate tubular object using at least one fastening element selectively wrapped around the bearing region and the tubing member; and, a winding zone formed by the bearing region and sloping smoothly into an enlarged middle region connected to said holding region, the winding zone including at least two resilient arm members extending in parallel to said elongate tubular member and along at least one of said opposite directions, the enlarged middle region being connected to said at least two resilient arm members of the winding zone by a conically tapering region, the conically tapering region including a pair of lateral recesses formed therein.

14. The mounting apparatus according to claim 13 wherein the enlarged middle region includes a transverse recess extending through the enlarged middle region in a direction transverse to said opposite extending directions of said bearing region.

15. The mounting apparatus according to claim 14 wherein said transverse recess includes a locking element formed therein.

16. A mounting apparatus for connecting an elongate tubular object to a support member, the mounting apparatus comprising:

a holding region for selectively attaching the mounting apparatus to an operatively associated support member;

a bearing region on the holding region and extending in opposite directions from opposite sides of the holding region, the bearing region having a face side adapted to engage an associated elongate tubular object and selectively attach to the elongate tubular object using at least one fastening element wrapped around the bearing region and the tubing member;

a winding zone formed by the bearing region, the winding zone including at least two resilient arm members separated from each other by a set of slots, the at least two resilient arm members extending in parallel to said elongate tubular member and along at least one of said opposite directions; and, at least one stop cog disposed on said face side of at least a one of said winding zone and said enlarged middle region.

17. The mounting apparatus according to claim 16 wherein said at least one stop cog includes a plurality of stop cogs disposed on said face side of at least a one of said winding zone and said enlarged middle region.

18. The mounting apparatus according to claim 17 wherein said plurality of stop cogs are substantially evenly spaced apart on said face side of at least a one of said winding zone and said enlarged middle region.

19. The mounting apparatus according to claim 18 wherein said plurality of evenly spaced apart stop cogs are arranged substantially along a line central of said face side of at least a one of said winding zone and said enlarged middle region.

20. A mounting apparatus for connecting an elongate tubular object to a support member, the mounting apparatus comprising:

a holding region for selectively attaching the mounting apparatus to an operatively associated support member;

a bearing region on the holding region and extending in opposite directions from opposite sides of the holding region, the bearing region having a face side adapted to engage an associated elongate tubular object and selectively attach to the elongate tubular object using at least one fastening element selectively wrapped around the bearing region and the tubing member;

a winding zone formed by the bearing region, the winding zone including at least two resilient arm members separated from each other by a set of slots, the at least two resilient arm members extending in parallel to said elongate tubular member and along at least one of said opposite directions; and, a circumferential sealing lip disposed between said holding region and said enlarged middle region.

21. The mounting apparatus according to claim 20 wherein said circumferential sealing lip is formed of a first material and includes a circular sealing ring formed of a second material softer than said first material.

22. The mounting apparatus according to claim 21 wherein said sealing ring forms a one of a polygonal and a round cross section.

23. The mounting apparatus according to claim 22 wherein said sealing ring is joined to said circumferential sealing lip by a one of a mechanical connection and a two-component extrusion process.

24. The mounting apparatus according to claim 23 wherein said holding region is formed as a one of a clips a profiled bolt, a threaded bolt, a bayonet locking unit, and a slider bearing.

25. The mounting apparatus according to claim 24 wherein said holding region is formed as said clip having a one of a round, oval and rectangular cross section.

26. The mounting apparatus according to claim 25 wherein said holding region formed as said clip includes at least two resilient stop arm members oriented toward said circumferential sealing lip and substantially evenly circumferentially distributed over the clip.

27. The mounting apparatus according to claim 26 wherein said at least two resilient stop arm members include a plurality of graduations formed thereon.

28. A mounting apparatus for connecting an elongate tubular object to a support member, the mounting apparatus comprising:

a holding region for selectively attaching the mounting apparatus to an operatively associated support member;

a bearing region on the holding area and projecting in opposite directions from opposite sides of the holding region, the bearing region having a face side adapted to engage an elongate tubular object and selectively attach to the elongate tubular object using at least one fastening element wrapped around the bearing region and the tubing member, the bearing region including a plurality of stop members disposed on an anterior area of the bearing region and on a side of the bearing region opposite said face sides; and, an arched winding zone defined in the face side of the bearing region, the arched winding zone extending in parallel to said elongate tubular member and along at least one of said opposite directions.

29. The mounting apparatus according to claim 28 wherein said plurality of stop members are shaped in a saw tooth configuration.

30. The mounting apparatus according to claim 29 wherein the bearing region includes a transverse recess extending through a central area of the bearing region in a direction transverse to said opposite extending directions of said bearing region.

31. The mounting apparatus according to claim 30 wherein the bearing region includes a pair of transverse recesses extending through a central area of the bearing region in a direction transverse to said opposite extending directions of said bearing region.

32. The mounting apparatus according to claim 28 further comprising at least one stop cog member disposed on said face side of the arched winding zone.

33. A mounting apparatus for connecting an elongate tubular object to a support member, the mounting apparatus comprising:

a holding regaion for selectively attaching the mounting apparatus to an operatively associated support member;

a bearing region on the holding area and projecting in opposite directions from opposite sides of the holding region, the bearing region having a face side adapted to engage an associated elongate tubular object and selectively attach to the elongate tubular object using at least one fastening element selectively wrapped around the bearing region and the tubing member; and, an arched winding zone defined in the face side of a central area of the bearing region, the arched winding zone forming an enlarged arch member at the central area of the bearing member and extending in parallel to said elongate tubular member and along at least one of said opposite directions, the enlarged arch member being formed in an asymmetrical configuration with respect to the bearing region.

34. The mounting apparatus according to claim 33 wherein said enlarged arch member formed in said asymmetrical configuration includes a pair of enlarged regions facing each other on diagonal opposite sides of said central area of the bearing region.

35. The mounting apparatus according to claim 34 further comprising an angular nose member disposed on an end of the arched winding zone and on a side of the bearing region opposite said face side.

36. The mounting apparatus according to claim 35 wherein said bearing region and said enlarged arch region include an elongate opening extending through the bearing region and the enlarged arch region.

37. A mounting apparatus for connecting an elongate tubular object to a support member, the mounting apparatus comprising:

a holding region for selectively attaching the mounting apparatus to an operatively associated support member, the holding region being adapted to arrestingly receive an associated profiled bolt therein;

a bearing region on the holding area and projecting in opposite directions from opposite sides of the holding region, the bearing region having a face side adapted to engage an elongate tubular object and selectively attach to the elongate tubular object using at least one band-shaped fastening element wrapped around the bearing region and the tubing member; and, an arched winding zone defined in the face side of the bearing region, the arched winding zone extending in parallel to said elongate tubular member and along at least one of said opposite directions, the holding region being disposed alongside the bearing region and adjacent and laterally displaced from a central region of the bearing region, wherein said holding region defines a recess including at least two resilient arresting arm members.

38. The mounting apparatus according to claim 37 wherein said recess defined by said holding region includes a one of a top cover and a cross piece member.

39. The mounting apparatus according to claim 38 wherein said recess is oblong in cross section.

40. The mounting apparatus according to claim 39 wherein said holding region is formed as a one of a clip, a profiled bolt, a threaded bolt, a bayonet locking unit, and a slider bearing.

* * * * *